United States Patent
Chaudhuri et al.

(10) Patent No.: US 11,168,979 B2
(45) Date of Patent: Nov. 9, 2021

(54) SINGLE-SHOT, ADAPTIVE METROLOGY OF ROTATIONALLY VARIANT OPTICAL SURFACES USING A SPATIAL LIGHT MODULATOR

(71) Applicant: University of Rochester, Rochester, NY (US)

(72) Inventors: Romita Chaudhuri, Rochester, NY (US); Jannick Rolland-Thompson, Seneca Falls, NY (US)

(73) Assignee: University of Rochester, Rochester, NY (US)

( * ) Notice: Subject to any disclaimer, the term of this patent is extended or adjusted under 35 U.S.C. 154(b) by 0 days.

(21) Appl. No.: 16/758,092

(22) PCT Filed: Oct. 23, 2018

(86) PCT No.: PCT/US2018/057075
§ 371 (c)(1),
(2) Date: Apr. 22, 2020

(87) PCT Pub. No.: WO2019/083981
PCT Pub. Date: May 2, 2019

(65) Prior Publication Data
US 2020/0326182 A1  Oct. 15, 2020

Related U.S. Application Data

(60) Provisional application No. 62/576,400, filed on Oct. 24, 2017.

(51) Int. Cl.
G01B 11/24 (2006.01)
G01B 9/02 (2006.01)
(Continued)

(52) U.S. Cl.
CPC ...... *G01B 11/2441* (2013.01); *G01B 9/02039* (2013.01); *G01M 11/005* (2013.01); *G01M 11/0271* (2013.01)

(58) Field of Classification Search
CPC ........... G01B 9/02039; G01B 11/2441; G01M 11/005; G01M 11/0271
See application file for complete search history.

(56) References Cited

U.S. PATENT DOCUMENTS

2006/0268282 A1\* 11/2006 Evans ................ G01M 11/0271
356/515
2008/0079950 A1\* 4/2008 Harned .............. G01M 11/0271
356/512
(Continued)

OTHER PUBLICATIONS

Cao, Zhaoliang et al. "Investigation of optical testing with a phase-only liquid crystal spatial light modulator". Optics Express, vol. 13, No. 4, Feb. 21, 2005, pp. 1059-1065. (Year: 2005).\*
(Continued)

*Primary Examiner* — Michael A Lyons
(74) *Attorney, Agent, or Firm* — Andrew J. Anderson, Esq.; Harter Secrest & Emery LLP

(57) ABSTRACT

Single-shot, adaptive metrology of rotationally variant optical surfaces, such as toroids, off-axis conies and freeform surfaces. An adaptive interferometric null test uses a high definition liquid crystal phase-only spatial light modulator (SLM) as the reconfigurable null element, on which a simulated nulling phase function is encoded, based on the specifications of the surface under test to generate a null interferogram. The power component of the surface sag is nulled by system design, not the SLM, enabling the SLM to fully compensate the residual departure without the need to tilt the optic or use a custom Offner-null. By wrapping the phase function at multiples of 2\*pi radian, the upper limit in sag of the optic under test is theoretically removed.

22 Claims, 7 Drawing Sheets

(51) Int. Cl.
*G01M 11/00* (2006.01)
*G01M 11/02* (2006.01)

(56) References Cited

U.S. PATENT DOCUMENTS

2009/0079992 A1* 3/2009 Doerband .......... G01B 9/02039
356/496
2012/0243001 A1* 9/2012 Rolland ............... G01M 11/005
356/513

OTHER PUBLICATIONS

Kacperski, Jacek et al. "Active, LCoS based laser interferometer for microelements studies". Optics Express, vol. 14, No. 21, Oct. 16, 2006, pp. 9664-9678. (Year: 2006).*
Ares, Miguel et al. "Active optics null test system based on a liquid crystal programmable spatial light modulator". Applied Optics, vol. 49, No. 32, Nov. 10, 2010, pp. 6201-6206. (Year: 2010).*
Holoeye. "GAEA-2 10 Megapixel Phase Only LCOS-SLM (Reflective)". Product page attained from https://holoeye.com/gaea-4k-phase-only-spatial-light-modulator/. Uploaded on Apr. 12, 2016. (Year: 2016).*

* cited by examiner

SINGLE-SHOT, ADAPTIVE METROLOGY OF ROTATIONALLY VARIANT OPTICAL SURFACES USING A SPATIAL LIGHT MODULATOR

STATEMENT REGARDING FEDERALLY SPONSORED RESEARCH OR DEVELOPMENT

Not applicable.

REFERENCE TO A "SEQUENCE LISTING"

Not applicable.

BACKGROUND

The embodiments of the disclosure are directed towards optical surface metrology, in particular, the apparatus for metrology of optical surfaces that are rotationally variant, such as toroids, off-axis conics, and freeform optical surfaces. A freeform surface may be parameterized by normalized basis functions such as the phi-polynomials (e.g. Zernike sets, Q-polynomials, other sets of orthogonal polynomials), XY polynomials, Radial Basis Functions, Splines, or Non-Uniform Rational Basis Splines (NURBS).

The most common method of testing a spherical or flat optical surface is full-field interferometry, which consists of an interferometer that provides a reference beam and a test or sample beam. The test beam, which is reflected back after being conditioned by the optic under test interferes with the reference beam to create interference fringes that are measured and used to generate a map of the surface deviation of the optical surface under test, from the reference optic. In testing optical surfaces with a large departure from a base sphere or flat in the conventional full-field interferometric configuration, the very high density of interference fringes created cannot be resolved by the CCD detector at the image plane of the full-field interferometer. To enable testing of optical surfaces with large departure from a sphere or flat (e.g. asphere, freeform optical surfaces), a null corrector is used in the reference or sample arm, that pre-conditions (shapes) the test wavefront to be normally incident on the optical surface under test. This test configuration is herein referred to as a "Null test". The pre-conditioned wavefront is generated by an appropriately designed null corrector, using the design specifications of the optical surface under test. If the surface was manufactured perfectly to the target specifications it was designed for, a null interferogram is generated by the interference of the shaped wavefront conditioned by the test optical surface, and the reference beam.

Null correctors may be built using conventional optical elements or diffractive optical elements. Conventional optical elements include refractive elements, reflective elements, and/or a combination of refractive and reflective elements. Null correctors that include refractive and/or reflective optical elements have limitations with respect to accuracy and the types of aspheric surfaces that can be tested. Diffractive null correctors can typically test many different types of aspherical optical surfaces and are typically more accurate than null correctors that include conventional optical elements. A diffractive null corrector includes a diffraction grating that is configured to produce a null wavefront corresponding to an optical surface being tested. An example of such a diffractive null corrector is a computer-generated hologram (CGH).

To avoid the typical high cost and schedule delays associated with asphere-based optical designs, software-based null correctors have been used to test the aspherical optical elements. In such software-based null correctors, the effect of the aspheric surface is not canceled out prior to entering the interferometer. Rather, an aberrated wavefront is allowed to propagate through the interferometer. The amount of error a perfectly fabricated aspheric surface would cause in the interferometer is calculated using a ray tracing program and then subtracted from the wavefront that is actually measured. The difference between the actual and predicted wavefronts is used as a measure of the surface error in the aspherical optical surface being analyzed. However, this technique only works over a limited range of asphericity because aberrations due to the asphericity can cause rays propagating through the interferometer system to be vignetted, and thereby prevent the whole optical surface from being analyzed. Such problems are especially relevant with regard to testing of optical surfaces which are "freeform" rotationally variant surface whose asymmetry goes beyond bi-axial symmetry or toroidal shape.

Freeform optical surfaces change the optical design landscape by enabling design forms that are truly off-axis. A challenge remains to create a method for measuring the surface quality of the as-fabricated freeform surfaces using the state-of-the-art fabrication processes. One potential method for measuring these surfaces is through the use of a computer-generated hologram (CGH) that acts as a nulling component in an interferometric arrangement. The quality of the measurement obtained with the CGH depends highly on the fabrication of the CGH and the arrangement in which it is placed in the interferometer. Moreover, each CGH is unique to one specific surface, which can be cost prohibitive for multiple surfaces. The CGH is also very expensive to manufacture, and the recurring cost of fabricating CGH for testing freeform surfaces with different specification, and the long lead-time associated with their fabrication makes the CGH impractical to use in situ during the manufacturing process. It is feasible only for testing finished parts. In this context, a reconfigurable null test to measure freeform optical surfaces is preferable, to lower the cost of making a custom null corrector for each freeform surface under test and to enable in situ measurement that can guide the manufacturing process to converge to the target specifications.

An embodiment of an adaptive/reconfigurable metrology apparatus is described in U.S. Pat. No. 8,817,270 B2 using a deformable mirror (DM) in combination with additional null optics to measure a freeform (phi-polynomial) optical surface. While the method overcomes the limitations of the CGH in terms of reconfigurability, it is largely limited in the maximum surface departure from the base sphere/flat (the departure of the surface from a flat is herein referred to as 'sag') that it can measure, due to the actuator stroke (typically in tens of micrometers). In addition, custom null optics (such as Offner-null lens) are required in the DM-based apparatus to enable testing of freeform optical surfaces which typically have a sag of hundreds of micrometers.

Another example of a reconfigurable null corrector is a spatial light modulator (SLM) which has traditionally been limited in optical-surface metrology applications due to their typically low spatial resolution. U.S. Pat. No. 7,443,514 describes a diffractive null corrector employing a spatial light modulator to perform a null test on aspheric optical surfaces that may be re-used to test optical surfaces of various shapes. Examples of spatial light modulators suggested for use therein include programmable mirror arrays and grating light valves. Testing of optical surfaces with high resolution phase only liquid crystal spatial light modulators, and in particular testing of freeform optical surfaces with phase only liquid crystal spatial light modulators is not disclosed.

Given the foregoing, what is needed are methods and systems for testing complex rotationally variant optical surfaces, including toroidal mirrors, off-axis conical mirrors and freeform surfaces, that may be re-used for testing such optical surfaces of various shapes during their manufacturing stages as well as for the finished optical piece. Null testing surfaces with large departures from a base sphere/flat necessitates the adaptive null corrector to support large peak-valley amplitudes of optical path length, which corresponds to more than hundreds of micrometers up to a few mm of sag in typical freeform optical surfaces.

BRIEF SUMMARY

In accordance with one embodiment of the disclosure, a method for testing a rotationally variant optical surface (e.g., toroid, off-axis conic, freeform) relative to a design specification for the optical surface is described, comprising: generating a test/sample beam from an interferometer in the form of a collimated beam of coherent light from electromagnetic radiation (e.g., typically from a frequency stabilized laser source); diffracting the sample beam with a phase-only liquid crystal spatial light modulator, wherein the phase-only liquid crystal spatial light modulator is controlled to form a shaped wavefront according to the design specifications of the optical surface under test, optimized for a diffraction order +1 and designed to null the departure of the surface from the reference beam; spatially filtering to remove other diffraction orders and imaging the +1 order diffracted beam shaped wavefront onto the optical surface being tested; conditioning the shaped wavefront with the optical surface being tested; producing a fringe pattern based on optical path differences and resulting interference between the shaped wavefront conditioned by the optical surface being tested and a reference beam provided from the interferometer; and analyzing the shape of the optical surface based on the fringe pattern.

In accordance with various embodiments, one or more of the following features may be used alone or in combination:

the design specification for the optical surface being tested is for a freeform rotationally variant surface whose asymmetry goes beyond bi-axial symmetry or toroidal shape;

a nulling phase function matching an optical path difference based on the design specifications for the surface being tested is phase wrapped and encoded on the phase only liquid crystal spatial light modulator designed for diffraction in the $+1^{st}$ order at the wavelength of the interferometer;

the phase function is encoded on the phase only liquid crystal spatial light modulator with a minimum of 2 pixels per period to satisfy Nyquist sampling, or a minimum of 3 pixels per period to exceed the Nyquist sampling, or a minimum of 4 pixels per period to satisfy higher diffraction efficiency than with 2 or 3 pixels per period;

the phase only liquid crystal spatial light modulator comprises pixels having a pixel pitch of less than 10 μm, or less than 5 μm;

the sample beam is linearly polarized prior to being diffracted by the phase-only liquid crystal spatial light modulator;

the phase-only liquid crystal spatial light modulator is tilted at an angle of from about 1-15 degrees relative to normal to the sample beam from the interferometer, or from about 1-5 degrees relative to normal to the sample beam from the interferometer;

the design specification of the rotationally variant optical surface being tested has a base spherical power component, and further comprising placing the optical surface being tested with the optical axis of the +1 order diffracted sample beam concentric to its medial center of curvature, and imaging the +1 order diffracted beam shaped wavefront onto the optical surface whose light passes through the medial center of curvature enabled by a spherical lens to null out a base spherical power component in optical path length differences between the shaped wavefront conditioned by the optical surface being tested and the reference beam provided from the interferometer;

the design specification of the optical surface being tested has a toroidal component in addition to a base spherical power component, and further comprising placing the optical surface being tested with the optical axis of the +1 order diffracted sample beam concentric to its medial center of curvature and imaging the +1 order diffracted beam shaped wavefront onto the optical surface with a spherical lens placed concentric to its radius of curvature, to null out the base spherical power component in optical path length differences between the shaped wavefront conditioned by the optical surface being tested and the reference beam of electromagnetic radiation provided from the interferometer, and tilting the optical surface being tested relative to the optical axis of the +1 order diffracted sample beam, and using a spherical mirror to return the sample beam reflected off the tilted optical surface being tested back to the sample being tested, to null the toroidal component of the optical path length difference between the shaped wavefront conditioned by the optical surface being tested and the reference beam of electromagnetic radiation provided from the interferometer;

the phase only liquid crystal spatial light modulator comprises a two-dimensional array of pixels having at least 1000 pixels in each dimension of the array, or at least 2000 pixels in each dimension of the array;

a tilt carrier phase function is added to the nulling phase function to form a composite phase function encoded on the phase only liquid crystal spatial light modulator to increase spatial separation of the +1 order diffracted beam from other orders of diffraction;

the composite phase function (nulling phase and tilt carrier phase) is encoded on the phase only liquid crystal spatial light modulator with a minimum of 2 pixels per period to satisfy Nyquist sampling, or a minimum of 3 pixels per period to exceed the Nyquist sampling, or a minimum of 4 pixels per period to satisfy higher diffraction efficiency than with 2 or 3 pixels per period.

BRIEF DESCRIPTION OF THE SEVERAL VIEWS OF THE DRAWING(S)

Figure 5:
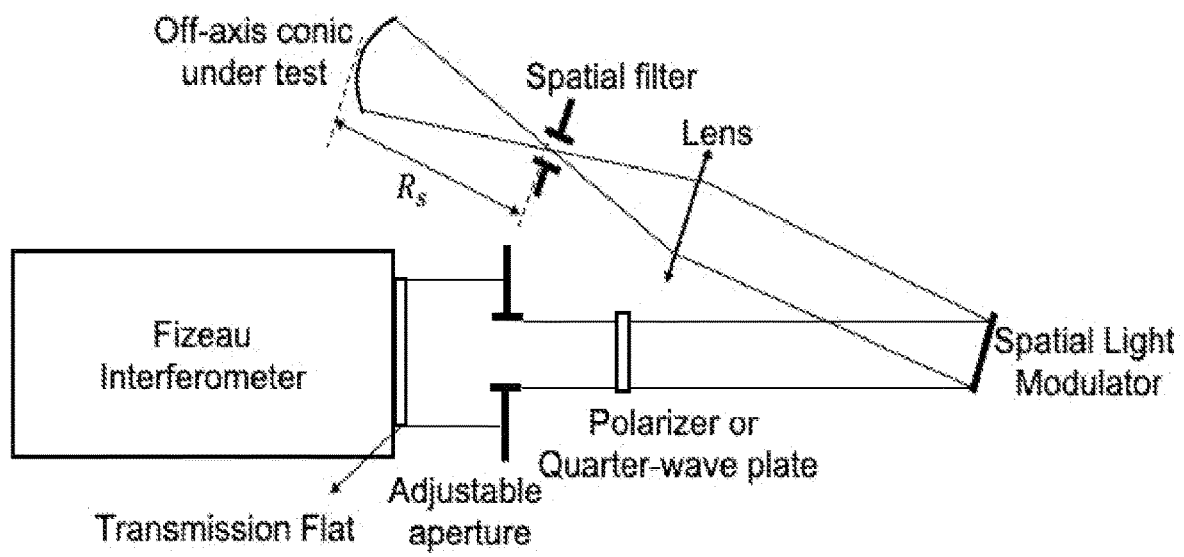
Figure 7:
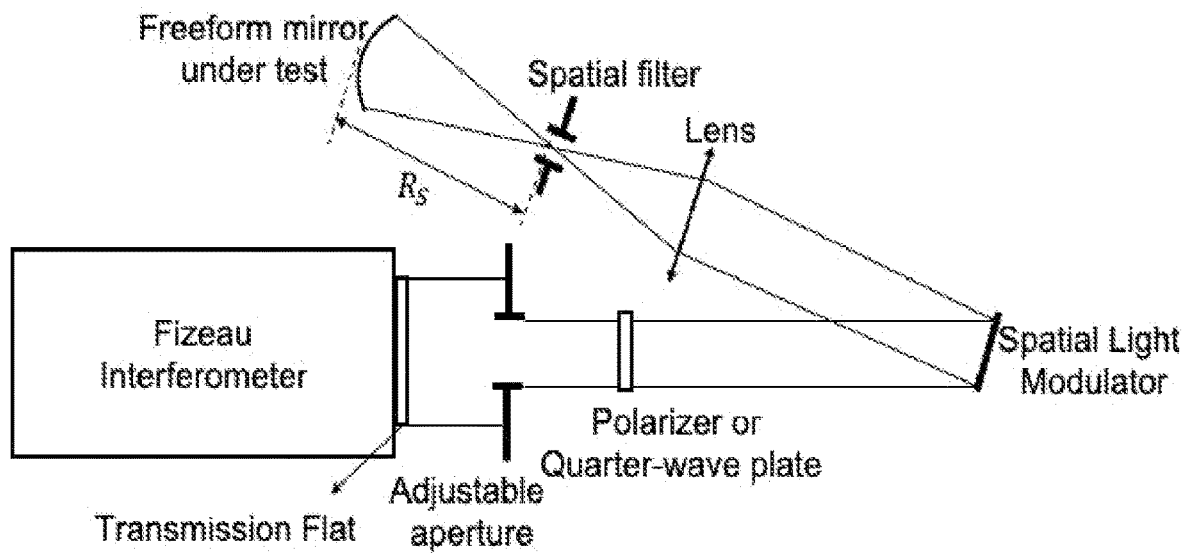
Figure 8:
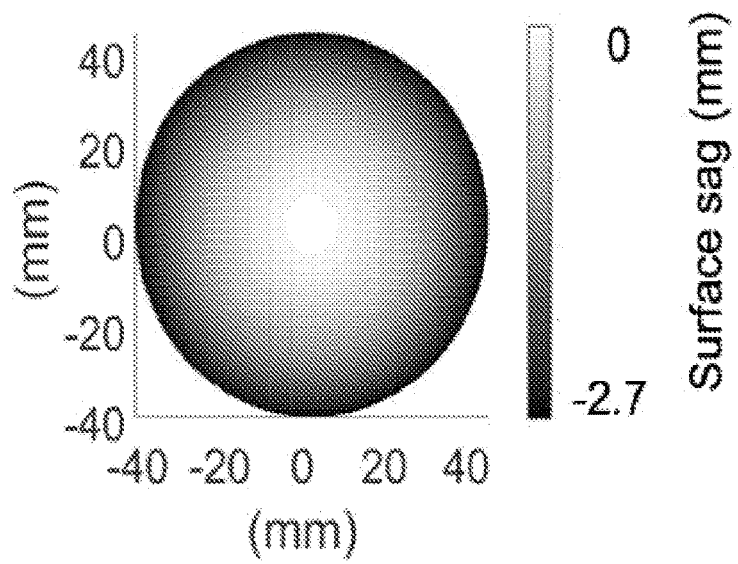
Figure 10:
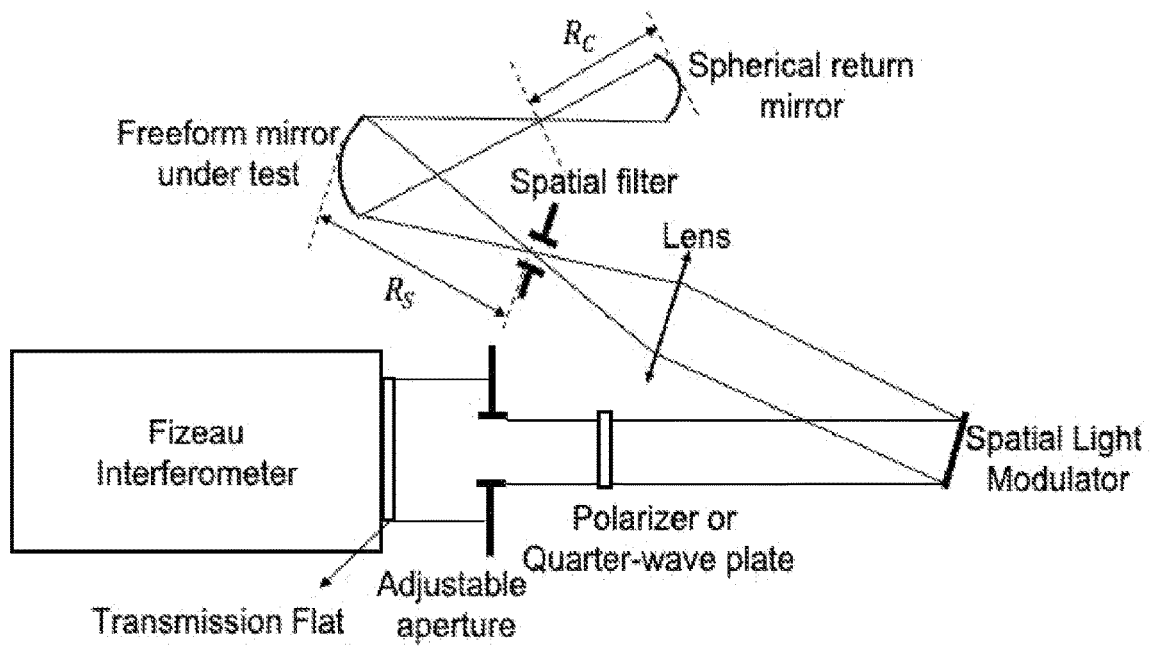
Figure 11:
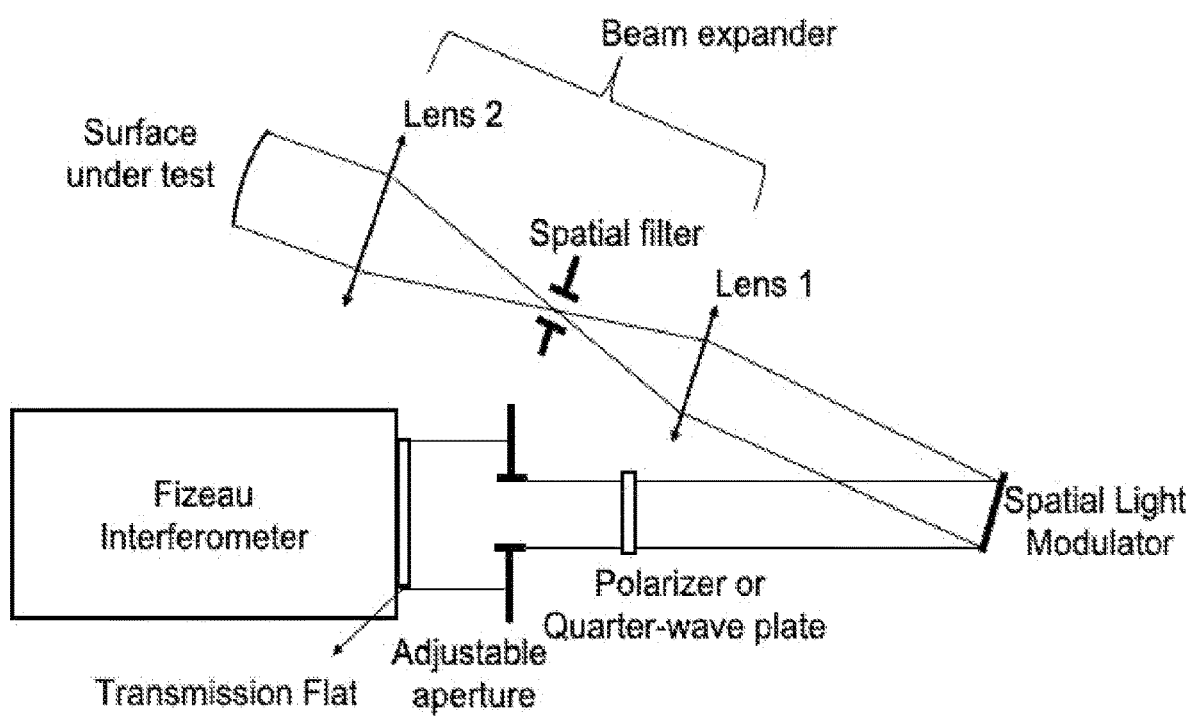

FIGS. 4(a)-(d) illustrate a system for metrology of toroidal mirrors in accordance with Example 2 of the disclosure;

FIG. 5 is a schematic illustrating a system for metrology of off-axis conical mirrors in accordance with Example 3 of the disclosure;

FIGS. 6(a)-(f) illustrate a system for metrology of off-axis conical mirrors in accordance with Example 3 of the disclosure;

FIG. 7 is a schematic illustrating a system for metrology of reflective freeform mirror with significant base sphere and mild toroidal component in accordance with Example 4 of the disclosure;

FIG. 8 is an illustration of a freeform mirror under test in an embodiment of Example 4 of the disclosure;

FIGS. 9(a)-(d) illustrate a system for metrology of freeform mirrors in accordance with Example 4 of the disclosure;

FIG. 10 is a schematic illustrating a system for metrology of freeform mirror with significant base sphere and strong toroidal component in accordance with Example 5 of the disclosure;

FIG. 11 is a schematic illustrating a system for metrology of reflective freeform optical surfaces with small departure from a flat in accordance with Example 6 of the disclosure.

DETAILED DESCRIPTION

Described herein is a null/quasi-null test method that uses a phase-only liquid crystal spatial light modulator as a reconfigurable element to test different surface types like toroids, off-axis conics, and freeform optical surfaces during their manufacturing stages (not just the finished piece). The technique allows for measurement of surfaces with a high sag departure from a flat/sphere, theoretically without any upper limit, by using an appropriately sized phase-only liquid crystal spatial light modulator and phase wrapping in combination with a conventional interferometer and optionally other optical elements. Any known full-field interferometer may be employed, e.g., a Fizeau interferometer or a Twyman-Green interferometer. The maximum slope of the aberration function that can be compensated using the phase-only liquid crystal spatial light modulator is limited by its Nyquist frequency (1/(2*pixel size)). To enable testing of surfaces with a sag and slope higher than the dynamic range of the phase-only liquid crystal spatial light modulator, the test configuration can be designed to null at least the spherical component of the surface. Specifically, by placing the optic concentric with the center of curvature of its base sphere/best-fit sphere, most of the spherical component of the phase function is removed. In addition, the surface can be tilted and used in conjunction with a reflecting sphere to also remove the toroidal component astigmatism, further reducing the residual aberrations that need to be nulled using the phase-only liquid crystal spatial light modulator. The residual aberrations (if any) are measured by an interferometer and can be nulled out in software, e.g., by using the difference between the designed nulling wavefront and the wavefront actually generated by the SLM as a hitmap to calibrate for the imperfections of the SLM backplane and non-linearity of the voltage-phase relationship of the SLM. Due to its adaptive nature, the method can be used (with little modification in hardware) to test a range of optical surfaces like toroids, off-axis conics and freeform optical surfaces, both during manufacturing and for the finished piece.

SLMs have traditionally been limited in their application in optical-surface metrology due to their low spatial resolution. However, recently developed high resolution phase-only liquid crystal spatial light modulators comprising a two-dimensional array of pixels having at least 1000 pixels in each dimension of the array, and more preferably at least 2000 pixels in each dimension of the array, and further having a pixel pitch of less than 10 μm, and even less than 5 μm (such as commercially available 10 megapixel HOLOEYE GAEA-2 phase only LCOS spatial light modulator having 4160×2464 pixel resolution ("4K") with 3.74 μm pixel pitch over active area of 15.32×9.22 mm), when used together with the disclosed null setups makes it possible to use the phase-only liquid crystal spatial light modulator for freeform metrology. The present disclosure in particular describes the use of a phase-only liquid crystal spatial light modulator based null test combining high resolution phase-only liquid crystal spatial light modulator hardware with phase wrapping and system design to reduce the effective amplitude and slope of the phase function. The upper limit on the peak-valley amplitude of the OPD function on the phase-only liquid crystal spatial light modulator is theoretically removed by "phase wrapping", where the phase is wrapped to 0 at multiples of 2*pi radian to create an equivalent diffractive optical element on the phase-only liquid crystal spatial light modulator.

In particular embodiments, a phase only spatial light modulator is used as a programmable null element for metrology of optical surfaces, where a nulling phase function matching the optical path difference (OPD) on the test surface is wrapped and encoded on the phase only spatial light modulator. The wrapped phase function in particular may be designed for diffraction in +1st order at the test wavelength (e.g. 632.8 nm in a specific embodiment). The higher the pixel per period, the lower is the maximum slope of the phase function that can be sampled by the phase only spatial light modulator. Smaller pixel pitch of the phase only spatial light modulator increases the max. slope that the phase only spatial light modulator can handle.

Given the trade-off between diffraction efficiency and the maximum slope that the SLM can sample, a minimum number of 2 pixels per period is required to satisfy Nyquist sampling, while a higher number of pixels per period may be employed to improve diffraction efficiency. A minimum number of 4 pixels per period, e.g., may be employed in some embodiments to enable at least ~50% diffraction efficiency while adequately sampling the wrapped phase function. The phase-only liquid crystal spatial light modulator is imaged to the part to mitigate the creation of higher order aberrations through propagation.

By wrapping the phase function at multiples of 2*pi radian, the upper limit in sag of the optic under test is theoretically removed. This is a major improvement over deformable mirror based null tests which are limited in the sag of the optic under test, due to the limited actuator stroke (in tens of micron). The upper limit in sag using a lower resolution SLM as the adaptive null corrector occurs in practice, from the limited number of pixels on the SLM. Availability of a larger number of pixels mitigates this upper limit in sag. The limit on the slope of the optic under test is imposed by the Nyquist sampling criterion, which is inversely related to the pixel size. The higher resolution (e.g. 4K) SLM available today enables the use of a phase-only SLM to be used in the disclosed embodiments to measure freeform surfaces where the spherical and toroidal components of the surface departure from a flat are nulled out by the system design to reduce the effective sag and associated slope of the residual component that is then nulled/quasi-nulled using the SLM. The residual interferogram may be measured, and then nulled using software to establish the final departure of the surface from the design specification.

As described herein, a phase-only liquid crystal spatial light modulator is controlled to form a shaped wavefront according to design specifications of an optical surface under test, optimized for a diffraction order +1 and designed to null the departure of the surface from the reference beam of an interferometer, wherein the shaped wavefront is then spatially filtered to remove other diffraction orders and the +1 order diffracted beam shaped wavefront is imaged onto the optical surface being tested. In various embodiments, a tilt carrier phase function may be added to the nulling phase function to form a composite phase function encoded on the phase only liquid crystal spatial light modulator to increase spatial separation of the +1 order diffracted beam from other orders of diffraction, and enable improved spatial filtering thereof. The tilt carrier phase function may be added, e.g., in a direction along either axis of the SLM or diagonally across the SLM (e.g., in either direction along a horizontal X-axis, a vertical Y-axis, or a diagonal direction across the SLM). The composite phase function (combined nulling phase and tilt carrier phase) may be encoded on the phase only liquid crystal spatial light modulator with a minimum of 2 pixels per period to satisfy Nyquist sampling, or higher numbers of pixels (e.g., a minimum of 3 pixels per period, or a minimum of 4 pixels per period) to exceed the Nyquist sampling and enable higher diffraction efficiency than with 2 pixels per period.

While the upper limit of sag of the surface that can be tested using the embodiments disclosed herein, is theoretically removed by phase wrapping, for a given phase-only liquid crystal spatial light modulator size (fixed number of pixels), the limit on the maximum peak-valley OPD can be calculated: For example, for 2464 pixels along the short axis of the spatial light modulator (as in the HOLOEYE GAEA-2-VIS-036), assuming the phase is wrapped every 2 pixels (>Nyquist sampling), and each wrapped period corresponds to $1\lambda$ (for 2 pi wrapping), the max. peak-valley OPD for a linear (tilt) wavefront is given by $(2464/4)*\lambda = 779.6$ μm where $\lambda$ is the selected test wavelength of 632.8 nm. Alternatively, if the phase is wrapped every 4 pixels, then the max. peak-valley OPD for a linear (tilt) wavefront in such system would instead be $(2464/4)*\lambda = 390$ μm. To enable testing of optical surfaces with a higher sag than allowed by the number of pixels, (e.g. 779.6 μm as calculated here for a 2 pixel per period phase wrapping), the system configuration is designed to null at least the spherical and/or at least part of the astigmatic component of the OPD, thus reducing the effective sag and slope of the wrapped phase function required to be encoded on the phase-only liquid crystal spatial light modulator. Note that the relevant slope is that of the residual wrapped phase function.

The mid-spatial frequency (MSF) period typically ranges from 2 mm-0.2 mm, as defined from an optical fabrication-based perspective. To resolve the complete MSF information up to 0.2 mm, the pixels of the SLM have to be mapped onto the part with at least 2 pixels within 0.2 mm, after being scaled by the magnification of the lens that images the SLM onto the part defined as mag=diameter of part/SLM short axis length. The maximum part diameter (D)=0.2 mm*SLM short axis length/(2*pitch) (e.g. for SLM short axis length=9.22 mm, pitch=3.74 um, D=246.5 mm or 9.7 inch) to resolve the entire MSF spectrum. Alternatively, if the pixels of the SLM are mapped to the part with 4 pixels within 0.2 mm, the maximum part diameter D would equal 123.3 mm or 4.85 inch in such system. To measure surface "form", the part diameter can be scaled further without a theoretical upper limit, as long as the maximum slope is within the Nyquist limit of the SLM. The trade-off with spatial frequency resolution on the part with the size of the part becomes less critical for large optics, where small tools that create MSFs are not typically used for fabrication.

While the present method using a specified phase-only liquid crystal spatial light modulator, can test surfaces up to for example 9.7 inches in diameter for resolving mid-spatial frequency (MSF) periods up to 0.2 mm, it can test surfaces with larger size up to any value, as long as the maximum effective slope of the corresponding wrapped optical path length function (given by $\tan^{-1}(n *\lambda/(2* \text{pixel size}))$, where n=integer value>=1, eg. n=1 for 2*pi phase wrapping, n=2 for 4 pi phase wrapping, etc.) of the freeform component of the test surface can be sampled by the phase-only liquid crystal spatial light modulator. As an example, the slope limit for the 4K resolution HOLOEYE GAEA-2, assuming 2 pixels per period and pitch of 3.74 μm, is 4.84 degree. Note that the 4.84 degree is that of the freeform departure from the best fit sphere, therefore parts with overall large slope values may be measured when accounting for the best fit sphere. In embodiments where a tilt carrier phase function is added to the nulling phase function to form a composite phase function encoded on the phase only liquid crystal spatial light modulator to increase spatial separation of the +1 order diffracted beam from other orders of diffraction, the 4.84 degree slope limit is the limit for the combined slope of the freeform departure from the best fit sphere and the tilt carrier. Larger parts can also be measured where the primary focus is on "form", rather than MSF since small tools that cause MSF are not used in fabrication of large optics.

The size of the short axis of the selected SLM in accordance with a specific embodiment is 9.22 mm, which enables a max. peak-valley OPD of the residual wrapped function on the SLM up to of 779.6 μm at a test wavelength of 632.8 nm which is chosen as the test wavelength to be implemented in hardware, for compatibility with the commercial Fizeau interferometer which has an Helium-Neon laser source at 632.8 nm.

The specified maximum sag departure and slope can be further increased even for the current size of commercially available SLMs by increasing the test wavelength (SLMs are available for wavelength up to 1700 nm) and manufacturing a larger size of the SLM.

Unique features enabled by the present disclosure include the higher sag departure that can be measured compared to use of deformable mirrors (DM) as a wavefront modifier. Current adaptive metrology techniques for freeform optical surfaces are based on deformable mirrors (DM). DMs are limited in the maximum peak-valley OPD they can produce, by the actuator stroke up to 10 μm. The phase-only liquid crystal spatial light modulator based methods described herein can support about one or two orders of magnitude larger in peak-valley OPD, (e.g.: a peak-valley OPD of up to 779.6 μm, for a fixed sized of the SLM (9.22 mm), and a test wavelength of 632.8 nm). In theory, the upper limit of sag can be removed by phase-wrapping, and using an appropriately sized phase-only liquid crystal spatial light modulator. To enable testing of optical surfaces with a higher sag departure than the limit imposed by the SLM size, the testing configuration can be designed to null at least the spherical and/or at least in part the toroidal component of the OPD, thus reducing the effective sag and consequently the slope of the phase function required to be encoded on the SLM.

With development in SLM technology in making the pixel pitch even smaller, and by designing larger SLMs for metrology applications, the dynamic range of the SLM-based null test can be tailored to measure off-axis conics and severe freeform optical surfaces.

Using an appropriate merit function, the phase function of the SLM can be iteratively optimized in experiment, to retrieve the exact surface shape of the test optic which can then be used to generate a hit-map that is used to correct the piece during manufacturing to converge to the final surface specification.

Figure 2A:
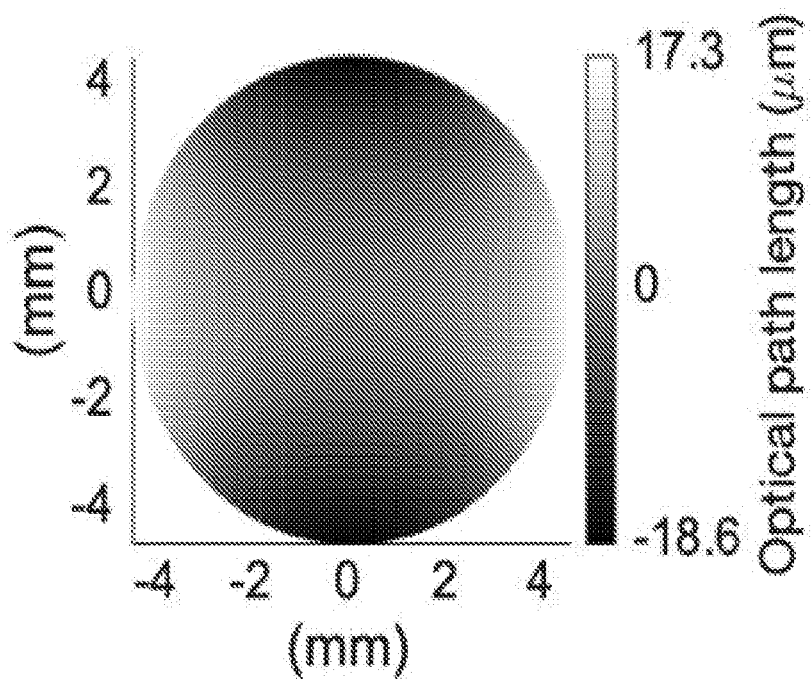
FIG. 2A is an illustration of a null interferogram generated in an embodiment of Example 1 of the disclosure.
Figure 2B:
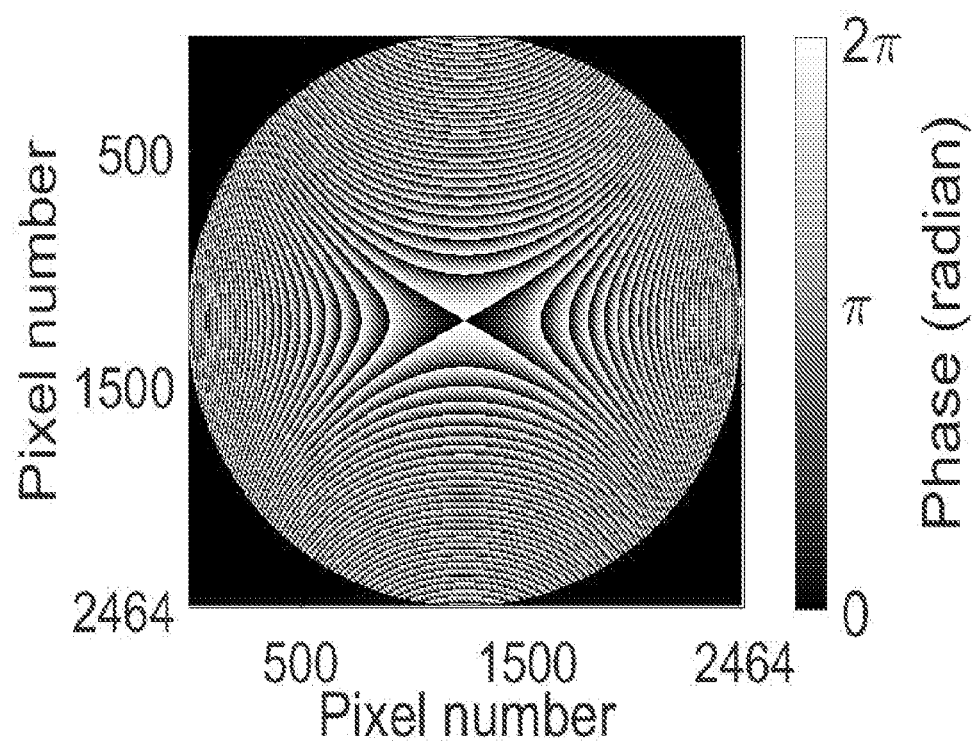
FIG. 2B is an illustration of an equivalent wrapped phase function corresponding to the null interferogram of FIG. 2A.
Figure 3:
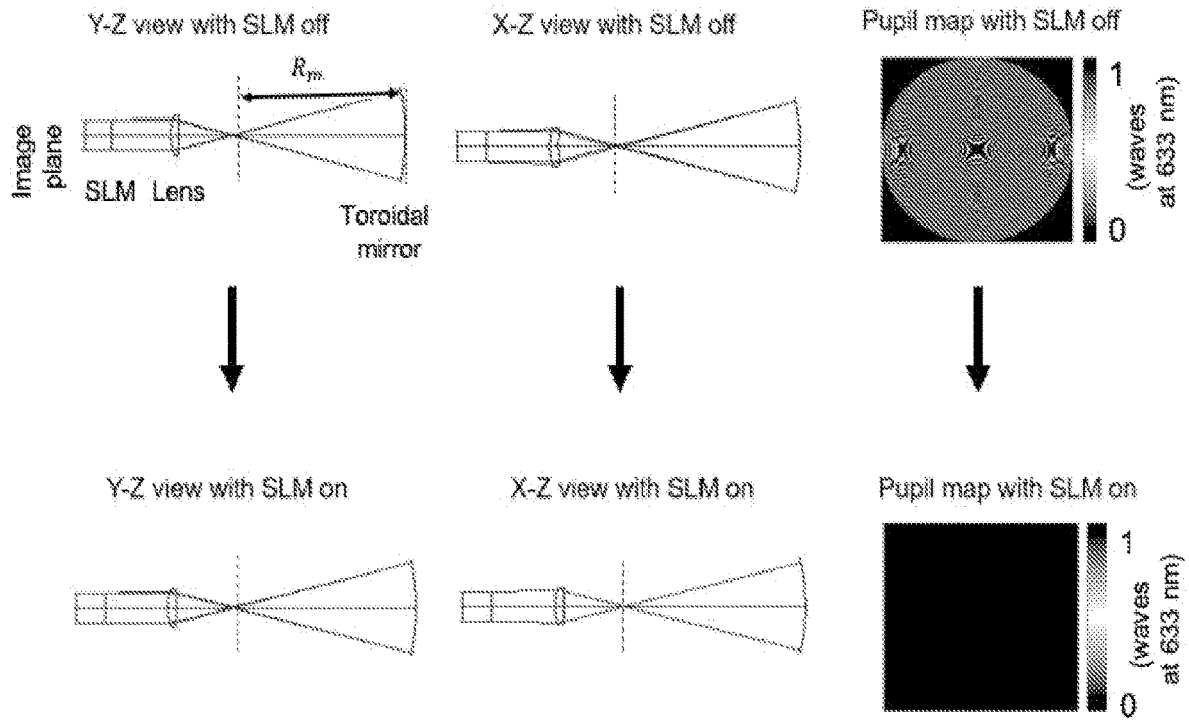
FIG. 3 illustrates before and after aberration correction with the SLM for Example 1 of the disclosure.

The following are general parameters for an example of the metrology space for the SLM-based null test that may be employed in various embodiments of the present disclosure:

shown in FIG. 2A. The continuous phase function corresponding to the OPD is wrapped in MATLAB as shown in FIG. 2B, and is discretized in steps equal to the pitch of the SLM (e.g. 3.74 μm). The minimum pixels per period of the wrapped phase function is 10 which is >2 pixels per period for Nyquist sampling criterion. Maximum slope of the phase function is 0.8 degree (<2.3 deg. max imposed by 4 pixels per period on the selected SLM). FIG. 3 illustrates before and after aberration correction with the SLM for Example 1.

| Metric | Value | Comments |
|---|---|---|
| Peak-valley OPD of the displayed phase function on the SLM (residual nulling phase function, or composite phase function when tilt carrier superimposed). | <779.6 μm at λ = 632.8 nm | This is the residual aberration after nulling out the spherical and toroidal components by system design, combined with a tilt carrier if employed. This limit can be increased by using larger SLM with more pixels. |
| Slope of the displayed phase function on the SLM (residual nulling phase function, or composite phase function when tilt carrier superimposed). | <4.84 degree at λ = 632.8 nm | This is the max. slope of the displayed phase assuming 2 pixels per period for > Nyquist sampling |
| Clear aperture of the optic under test | <9.7 inch to resolve typical MSF period of 0.2 mm or as limited by the max. slope of the residual nulling phase function of the SLM | Scalable to test larger objects as long as the slope of the wrapped phase function is within the Nyquist limit |
| Spatial resolution on the test optic | >0.2 mm | Covers the surface form and MSF period up to 0.2 mm |
| Data acquisition time | Instantaneous (barring initial alignment time) | Single shot measurement |
| Reflective/transmissive test optic | Best for reflective optics, can measure transmissive optics with one side plano | Transmissive optical element with a non-spherical/non-plano surface shape on both surfaces will result in combined aberration functions difficult to decouple from each other |
| Surface shape/profile | Toroids, off-axis conics, freeform optical surfaces | Reconfigurable test, can be adapted to a variety of surface shapes |

Note:
All the values are calculated for the HOLOEYE 4K SLM with a pixel pitch of 3.74 um, and a short axis length of 9.22 mm, and test wavelength of 632.8 nm.

EXAMPLES

1. Metrology of Toroidal Mirrors

Figure 1:
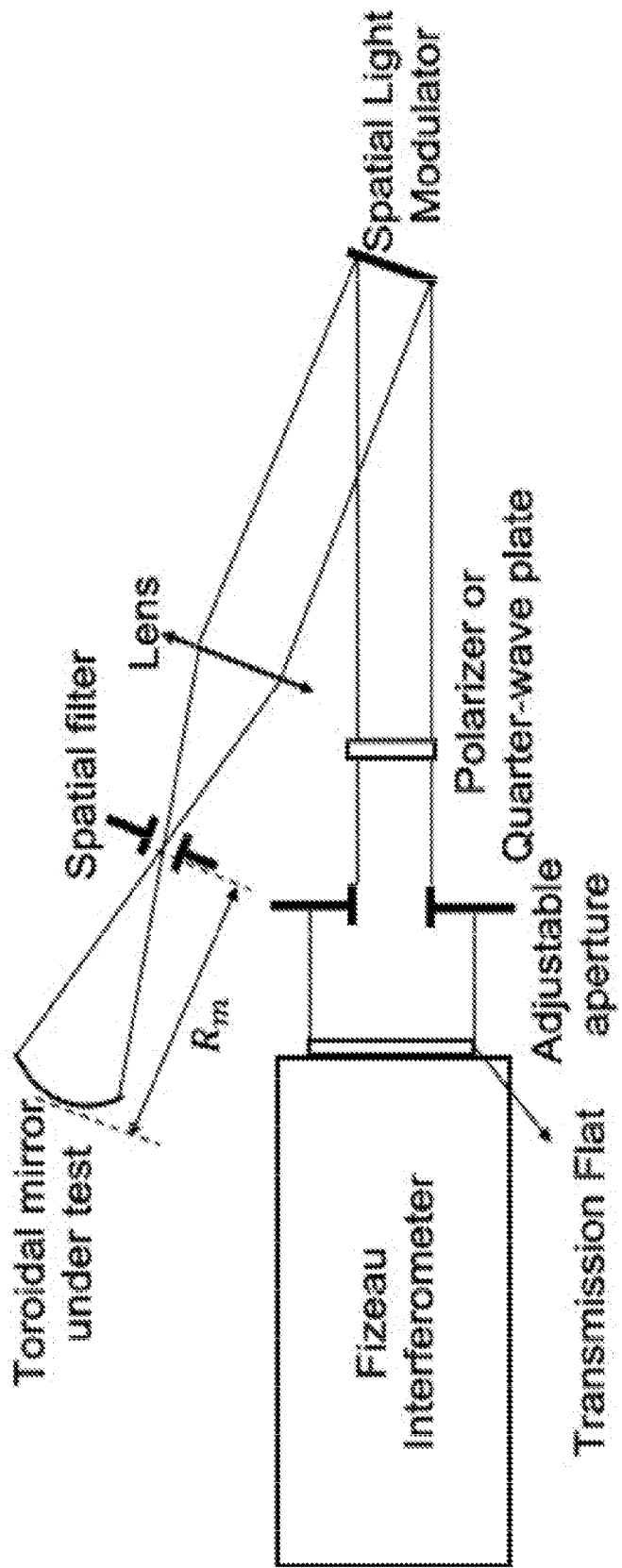
FIG. 1 is a schematic illustrating a system for metrology of toroidal mirrors in accordance with Example 1 of the disclosure.

With reference to FIG. 1, a collimated beam from the interferometer through the transmission flat is stopped down using the adjustable aperture that may or may not be conceived with soft edges to a diameter of 9.22 mm (which matches the short axis length of the SLM). The circularly polarized 632.8 nm laser output of the interferometer is converted to linear polarization via a linear polarizer or a quarter-wave plate. The angle of tilt of the SLM (to clear the beam from the interferometer) is maintained <5 deg. in this embodiment for accurate phase reproduction. The toroid under test has Rx (sagittal)=62 mm, Ry (tangential)=63.3 mm, and clear aperture=28 mm, which is placed concentric to its medial center of curvature to remove the spherical component with a base radius Rm (medial radius of curvature). The lens 1 images the SLM to the toroidal mirror, the spatial filter removes the other diffraction orders (i.e. m=0, −1, +2, −2), and the SLM is encoded with the phase function corresponding to the astigmatism of the toroid, wrapped every 2*pi.

The OPD function is optimized in Code V software to generate a null interferogram, peak-valley OPD: 30 μm as 2. Metrology of Toroidal Mirrors Employing SLM with Tilt Carrier Superimposed With reference to FIGS. 4(a)-(d), the aberration correction of the departure of a toroid as described in Example 1 from a medial sphere is shown, where the layout is similar to that shown in FIG. 1, except a tilt carrier is superimposed on the nulling phase function encoded on the SLM to enhance separation of the diffraction orders spatially (as shown in FIG. 4(d)) and filtering of the +1 order passed through the spatial filter (iris).

Figure 4:
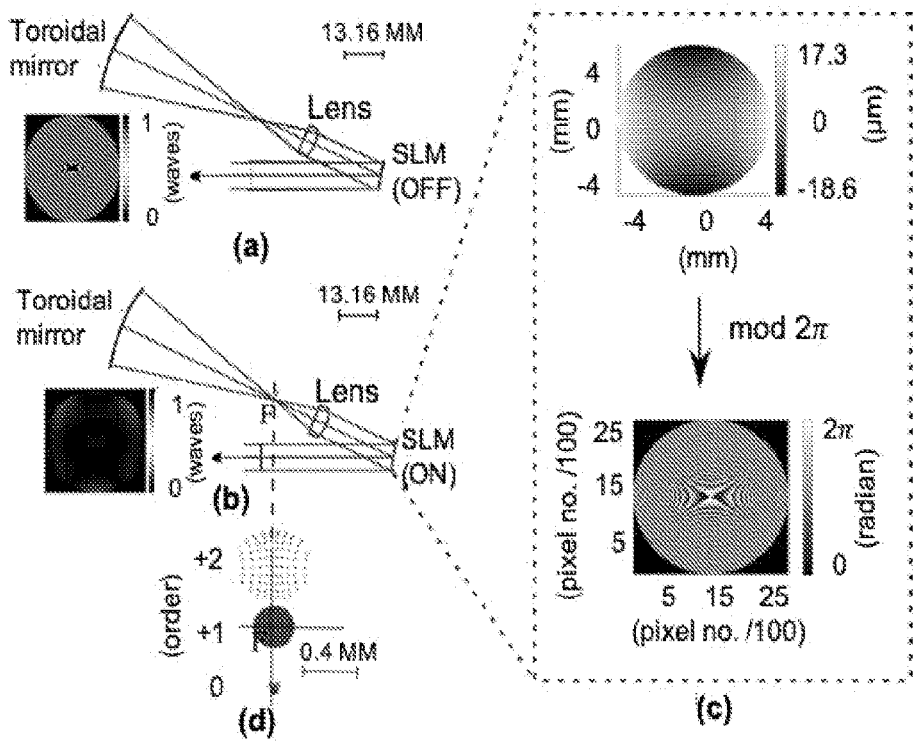

FIG. 4(a) shows the layout and interferogram before correction when the SLM is switched off. FIG. 4(b) shows the layout and residual interferogram after the SLM displays the nulling wavefront. FIG. 4(c) (top) shows the nulling wavefront optimized in optical design software and FIG. 4(c) (bottom) shows the 2 pi wrapped phase function. The spatial separation of the diffraction orders on application of the tilt carrier is shown in FIG. 2(d). The P-V amplitude of the composite wavefront (nulling wavefront+tilt carrier) is 210 μm and the maximum slope is 1.65°, which are within the limits of wavefront amplitude and Nyquist limit of the SLM calculated earlier.

In such embodiment with added tilt carrier phase function, the angle of tilt of the SLM (to clear the beam from the interferometer) is maintained <15 deg. for accurate phase reproduction, and the OPD function is optimized in Code V software to generate a null interferogram, peak-valley OPD: 35.8 μm as shown in FIG. 4(c), and the continuous phase function corresponding to the OPD is wrapped in MATLAB and is discretized in steps equal to the pitch of the SLM (e.g. 3.74 μm) as also shown in FIG. 4(c). On application of the pixelated wavefront, a residual aberration of 0.05λ RMS is observed, as shown in FIG. 4(b).

3. Metrology of Off-Axis Conical Mirrors

With reference to FIG. 5, the layout is similar to that shown in FIG. 1 except an off-axis conic is placed concentric to a best fit sphere that minimizes the peak-valley sag departure from the sphere. The off-axis conic under test is a 45 degree off axis parabolic (OAP) mirror with reflected focal length of 100 mm, clear aperture of 25.4 mm, and the radius of curvature of the best-fit sphere is 217.29 mm to which the mirror is placed concentric so as to remove the power component. The lens 1 images the SLM to the off-axis parabolic mirror, the spatial filter removes the other diffraction orders (i.e. m=0, −1, +2, −2), and the SLM is encoded with the phase function corresponding to the astigmatism of the toroid, wrapped every 2*pi. A tilt carrier is superimposed in this embodiment to separate the diffraction orders.

Figure 6:
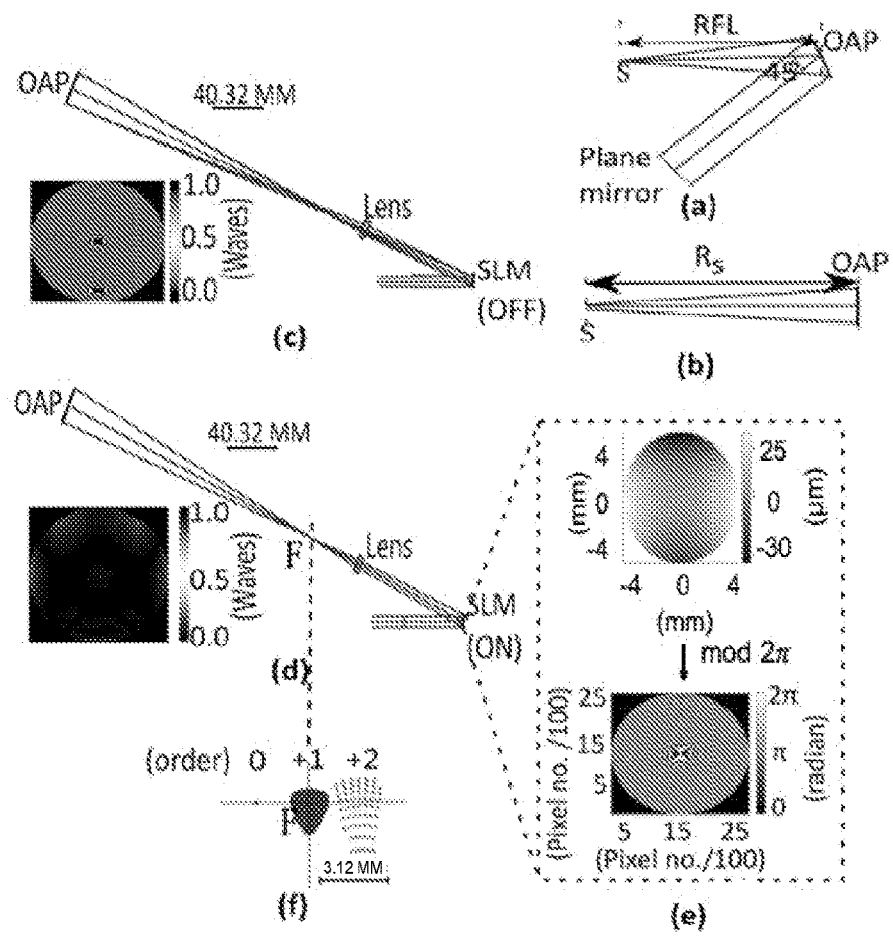

With reference to FIG. 6(a)-(f), the aberration correction of the departure of the off-axis parabolic mirror from the medial sphere is shown. FIG. 6(a) shows the modelling of the off-axis parabolic mirror in optical design software, FIG. 6(b) shows the optimized best fit sphere with radius of curvature $R_S$. FIG. 6(c) shows the layout and interferogram before correction when the SLM is switched off. FIG. 6(d) shows the layout and residual interferogram after the SLM displays the nulling wavefront. FIG. 6(e) (top) shows the nulling wavefront optimized in optical design software and FIG. 6(e) (bottom) shows the 2 pi wrapped phase function. The spatial separation of the diffraction orders on application of the tilt carrier is shown in FIG. 6(f). The P-V amplitude of the composite wavefront (nulling wavefront+tilt carrier) is 319.09 μm and the maximum slope is 2.61°, which are within the limits of wavefront amplitude and Nyquist limit of the SLM calculated earlier.

4. Metrology of Reflective Freeform Mirror with Significant Base Sphere and Mild Toroidal Component With reference to FIG. 7, since the mirror under test has significant curvature of the base, it is tested by placing it concentric to a 'fitted sphere'. As before, we do polarization management and filter all diffraction orders other than +1. This technique nulls out the base spherical power component from the freeform corresponding to the fitted sphere, without having to design a custom Offner null compensator lens for the part. This is because a variable amount of spherical component can be nulled out as required for various parts, by changing the distance of the part from the focus of the lens 1. Removing the fitted sphere from the freeform greatly reduces the maximum sag and associated slope of the residual freeform, bringing it within the dynamic range of the SLM for correction. In addition, on-axis testing simplifies alignment which is challenging in the deformable mirror based null test owing to the precise angle at which the optic needs to be tilted to null astigmatism in the latter. Lens 1 images the mirror on to the SLM ensuring that the SLM is encoded with the aberrations on the test optic, without creation of the higher order aberrations.

With reference to FIG. 8, an example freeform mirror used as a test optic is shown. The freeform mirror has a clear aperture of 80 mm, surface sag of 2.7 mm, and a max. slope of 7.72 deg. It is described by a base sphere with radius of curvature of −300 mm, a conic constant of −0.56, and 37 Fringe Zernike polynomial terms.

The OPD function is optimized in Code V software to generate a quasi-null interferogram, and a tilt carrier is added to the nulling wavefront in this embodiment resulting in a peak-valley OPD of 315.7 μm. Maximum slope of the phase function is 2.63 degree, which is within the Nyquist limit of the SLM.

Figure 9:
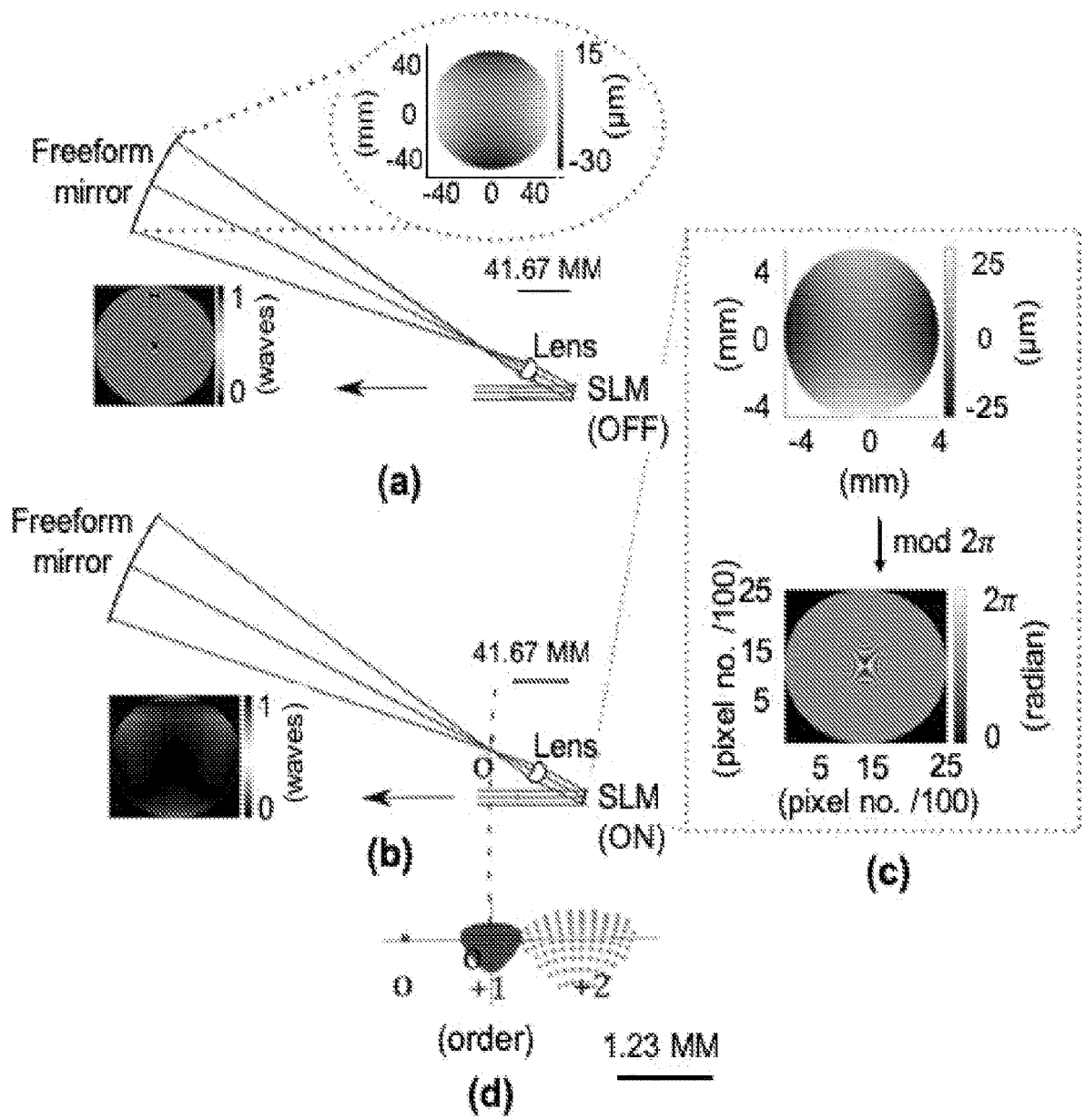

With reference to FIG. 9(a)-(d), the correction of the freeform departure after nulling the best-fit sphere is shown. In FIG. 9(a), the residual sag on the freeform mirror with peak-valley of 48.6 μm on the mirror after removing a best-fit sphere with radius of curvature of −300.87 mm is shown. FIG. 9(a) also shows the layout with the SLM switched off, and the corresponding interferogram before correction with the SLM. FIG. 9(b) shows the layout and residual interferogram after the optimized nulling phase function is applied to the SLM. FIG. 9(c) (top) shows the optimized nulling wavefront and (bottom) the corresponding phase function. After a tilt carrier is superimposed on the nulling phase, the spatial separation of the diffraction orders are shown in FIG. 9(d).

5. Metrology of Freeform Mirror with Significant BSasephere and Strong Toroidal Component The surfaces used for simulation of the previous embodiments described before, were suitable to be tested by the SLM through removal of the fitted spherical component alone. However, for freeform surfaces with significant toroidal component, removal of only the spherical component may not be sufficient to reduce the sag and associated slope of the residual shape to the maximum values set by the Nyquist limit of the specific SLM. For such cases, tilting the surface in addition to removing the spherical component is essential to enable testing of the residual component by the SLM, which is described in this embodiment.

With reference to FIG. 10, as before, we do polarization management and filter all diffraction orders other than +1. Since the mirror has significant curvature of the base, it is tested by placing it concentric to a 'fitted sphere' as described before. For the cases we demonstrated in previous embodiments, the base sphere which the freeform surface is placed concentric to, is the one which minimizes the peak-valley sag of the residual surface profile. To enhance the capability of the SLM to null the residual form, a best-fit sphere that minimizes the maximum slope of the wrapped phase function can be selected. If a freeform surface has a high toroidal component in addition to the base sphere, the surface can be tilted in the configuration shown alongside, where a spherical mirror is used as a return surface, placed concentric to its radius of curvature, $R_C$. Removing the appropriately chosen fitted sphere and the toroidal component by tilting the surface greatly reduces the maximum sag and associated slope of the residual freeform, bringing it within the dynamic range of the SLM for correction. Lens 1 images the mirror on to the SLM ensuring that higher order aberrations are not induced.

6. Metrology of Reflective Freeform Optical Surfaces with Small Departure from a Flat With reference to FIG. 11, the layout for testing freeform surfaces without a significant base curvature is shown. In this case, we use an afocal telescope consisting of two lenses Lens 1 and Lens 2 with the suitable magnification to image the SLM on the optic under test. The nulling wavefront on the SLM is optimized to compensate the departure of the optic under test from a flat, and a tilt carrier as before may be superimposed to spatially separate the diffraction orders other than +1.

It will be appreciated that variants of the above-disclosed embodiments and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A method for testing a rotationally variant optical surface relative to a design specification for the optical surface, comprising:
   providing a sample beam from an interferometer in the form of a collimated beam from electromagnetic radiation;
   diffracting the sample beam in the form of a collimated beam with a phase-only liquid crystal spatial light modulator, wherein the phase-only liquid crystal spatial light modulator is controlled to form a shaped wavefront for a diffraction order +1 designed to null the departure of the optical surface under test, from a sphere or a flat, based on the design specifications of the optical surface;
   spatially filtering to remove other diffraction orders and imaging the +1 order diffracted beam shaped wavefront onto the optical surface being tested;
   conditioning the shaped wavefront with the optical surface being tested;
   producing a fringe pattern based on optical path differences and resulting interference between the shaped wavefront conditioned by the optical surface being tested and a reference beam of electromagnetic radiation provided from the interferometer; and
   analyzing the shape of the optical surface based on the fringe pattern;
   wherein a nulling phase function designed for the +1st order at the wavelength of the interferometer and matching an optical path difference based on the design specifications for the surface being tested is phase wrapped and encoded on the phase only liquid crystal spatial light modulator, and further comprising adding a tilt carrier phase function to the nulling phase function to form a composite phase function encoded on the phase only liquid crystal spatial light modulator to increase spatial separation of the +1 order diffracted beam from other orders of diffraction.

2. The method of claim 1, wherein the design specification for the rotationally variant optical surface being tested is for a freeform rotationally variant surface whose rotational asymmetry goes beyond bi-axial symmetry or toroidal shape.

3. The method of claim 1, wherein the nulling phase function is encoded on the phase only liquid crystal spatial light modulator with a minimum of 2 pixels per period to satisfy Nyquist sampling.

4. The method of claim 1, wherein the nulling phase function is encoded on the phase only liquid crystal spatial light modulator with a minimum of 3 pixels per period.

5. The method of claim 1, wherein the nulling phase function is encoded on the phase only liquid crystal spatial light modulator with a minimum of 4 pixels per period.

6. The method of claim 1, wherein the phase only liquid crystal spatial light modulator comprises pixels having a pixel pitch of less than 10 µm.

7. The method of claim 1, wherein the phase only liquid crystal spatial light modulator comprises pixels having a pixel pitch of less than 5 µm.

8. The method of claim 1, wherein the sample beam is linearly polarized prior to being diffracted by the phase-only liquid crystal spatial light modulator.

9. The method of claim 1, wherein the phase-only liquid crystal spatial light modulator is tilted at an angle of from about 1-15 degrees relative to normal to the sample beam from the interferometer.

10. The method of claim 1, wherein the design specification of the rotationally variant optical surface being tested has a base spherical power component, and further comprising placing the optical surface being tested with the optical axis of the +1 order diffracted sample beam concentric to its medial center of curvature and imaging the +1 order diffracted beam shaped wavefront onto the optical surface with a spherical lens to null out a base spherical power component in optical path length differences between the shaped wavefront conditioned by the optical surface being tested and the reference beam provided from the interferometer.

11. The method of claim 1, wherein the design specification of the rotationally variant optical surface being tested has a toroidal component in addition to a base spherical power component, and further comprising placing the optical surface being tested with the optical axis of the +1 order diffracted sample beam concentric to its medial center of curvature and imaging the +1 order diffracted beam shaped wavefront onto the optical surface with a spherical lens to null out the base spherical power component in optical path length differences between the shaped wavefront conditioned by the optical surface being tested and the reference beam of electromagnetic radiation provided from the interferometer, and tilting the optical surface being tested relative to the optical axis of the +1 order diffracted sample beam, and using a spherical mirror to return the sample beam reflected off the tilted optical surface being tested back to the sample being tested, to null the toroidal component of the optical path length difference between the shaped wavefront conditioned by the optical surface being tested and the reference beam of electromagnetic radiation provided from the interferometer.

12. The method of claim 11, wherein the phase-only liquid crystal spatial light modulator is encoded with the composite wrapped phase function to null the residual optical path length difference between the shaped wavefront conditioned by the optical surface being tested and the reference beam of electromagnetic radiation provided from the interferometer, after nulling the toroidal component and base spherical power component by geometry of the configuration.

13. The method of claim 1, wherein the design specification of the rotationally variant optical surface being tested does not have a base spherical power component and further comprising placing the optical surface being tested along the optical axis of the +1 order diffracted sample beam and imaging the +1 order diffracted beam shaped wavefront onto the optical surface with an afocal telescope.

14. The method of claim 13, wherein the phase-only liquid crystal spatial light modulator is encoded with the composite wrapped phase function to null the residual optical path length difference between the shaped wavefront conditioned by the optical surface being tested and the reference beam of electromagnetic radiation provided from the interferometer.

15. The method of claim 1, wherein the phase only liquid crystal spatial light modulator comprises a two-dimensional array of pixels having at least 1000 pixels in each dimension of the array.

16. The method of claim 15, wherein the phase only liquid crystal spatial light modulator comprises pixels having a pixel pitch of less than 10 μm in each dimension of the array.

17. The method of claim 15, wherein the phase only liquid crystal spatial light modulator comprises pixels having a pixel pitch of less than 5 μm in each dimension of the array.

18. The method of claim 1, wherein the phase only liquid crystal spatial light modulator comprises a two-dimensional array of pixels having at least 2000 pixels in each dimension of the array.

19. The method of claim 18, wherein the phase only liquid crystal spatial light modulator comprises pixels having a pixel pitch of less than 10 μm in each dimension of the array.

20. The method of claim 18, wherein the phase only liquid crystal spatial light modulator comprises pixels having a pixel pitch of less than 5 μm in each dimension of the array.

21. The method of claim 1, wherein the composite phase function is encoded on the phase only liquid crystal spatial light modulator with a minimum of 2 pixels per period.

22. The method of claim 1, wherein the rotationally variant optical surface comprises at least one of a toroid, off-axis conic, or freeform optical surface.

* * * * *